(12) United States Patent
Wainfan et al.

(10) Patent No.: US 7,834,859 B2
(45) Date of Patent: Nov. 16, 2010

(54) PROCESS FOR RECOVERING A SPACECRAFT FIRST STAGE

(75) Inventors: Barnaby S. Wainfan, Long Beach, CA (US); Warren W. James, South Pasadena, CA (US); Daniel H. Sokol, Burbank, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1036 days.

(21) Appl. No.: 11/599,799

(22) Filed: Nov. 15, 2006

(65) Prior Publication Data

US 2008/0111030 A1 May 15, 2008

(51) Int. Cl.
*G06F 3/41* (2006.01)
*B64G 1/00* (2006.01)
*B64G 1/14* (2006.01)
(52) U.S. Cl. .................. 345/173; 244/158.9; 244/159.3
(58) Field of Classification Search ................. 345/173; 244/2, 54, 55, 58, 172, 158 R, 171.3, 158.9
See application file for complete search history.

(56) References Cited

U.S. PATENT DOCUMENTS

| | | | | |
|---|---|---|---|---|
| 5,568,901 | A * | 10/1996 | Stiennon | 244/171.3 |
| 6,158,693 | A * | 12/2000 | Mueller et al. | 244/158.9 |
| 6,450,452 | B1 * | 9/2002 | Spencer et al. | 244/159.3 |
| 6,454,216 | B1 * | 9/2002 | Kiselev et al. | 244/159.3 |
| 6,612,522 | B1 * | 9/2003 | Aldrin et al. | 244/2 |
| 7,494,089 | B2 * | 2/2009 | Williams et al. | 244/3.16 |
| 2001/0010347 | A1 * | 8/2001 | Hart et al. | 244/158 R |
| 2003/0192984 | A1 * | 10/2003 | Smith | 244/2 |

* cited by examiner

*Primary Examiner*—Prabodh M Dharia
(74) *Attorney, Agent, or Firm*—Louis L. Dachs

(57) ABSTRACT

The process comprises the steps of: 1) launching the vehicle from the launch site using the first stage booster rocket engine system; 2) separating the at least one upper stage from the first stage booster; 3) terminating operation of the first booster stage rocket engine system; 4) turning the first stage booster back toward the launch site using the aerodynamic flight control system; 5) operating the first stage booster rocket engine system to boost the first stage booster to an altitude sufficient to allow non-powered flight back to the launch side; and 6) landing the first stage booster at the launch site.

2 Claims, 3 Drawing Sheets

PROCESS FOR RECOVERING A SPACECRAFT FIRST STAGE

BACKGROUND OF THE INVENTION

1. Field of the Invention

The invention relates to multi-stage vehicles for launching payloads into space; and, in particular, to a process for recovery of a recoverable first stage of the launch vehicle.

2. Description of Related Art

In the past, expendable multistage rockets were used to boost payloads into space (earth orbit or beyond). However, boosters are expendable. This is especially true if they are man rated. Thus reusable boosters have been designed and the reusable space shuttle is in operation.

The Kistler-K1 Reusable Launch Vehicle or Space Shuttle have a return to launch site (RTLS) maneuvers. The toss back maneuver that the Kistler K-1 performs to return to the launch site uses rocket propulsion to rotate the velocity vector of the K-1 such that the resulting ballistic trajectory terminates back at the launch site. Likewise, the Space Shuttle RTLS uses rocket propulsion to slow the vehicle and rotate its velocity vector so that the resulting trajectory places the Shuttle within gliding range of the landing site. In both of the preceding examples rocket propulsion is used to reverse the heading of the vehicle so that additional rocket propulsion can be used to return the vehicle to the launch site. Neither of these approaches minimizes energy consumption.

U.S. Pat. No. 6,450,452 Fly Back Booster by R. B. Spenser and U.S. Pat. No. 6,612,522 Flyback Booster With Removable Rocket Propulsion Module by B. Aldrin, et al. both use jet engines mounted on the booster to power the booster back to the launch site. However, the use of a separate propulsion system adds weight and significantly raises the cost of the booster.

Thus, it is a primary object of the invention to provide a procedure for recovering the first stage of a multistage spacecraft booster.

It is another primary object of the invention to provide a procedure for recovering the first stage of a multistage spacecraft booster that makes use of the existing propulsion system used at lift off.

It is a further object of the invention to provide It is another primary object of the invention to provide a procedure for recovering the first stage of a multistage spacecraft booster that makes use of the existing propulsion system used at lift off that returns the first stage to the point of launch.

SUMMARY OF THE INVENTION

The invention is a process for returning the first stage booster of a launch vehicle having at least one upper stage, the first stage booster having a rocket engine system and aerodynamic flight control system, to the launch site, the process comprising the steps of: 1) launching the vehicle from the launch site using the first stage booster rocket engine system; 2) separating the at least one upper stage from the first stage booster; 3) terminating operation of the first booster stage rocket engine system; 4) turning the first stage booster back toward the launch site using the aerodynamic flight control system; 5) operating the first stage booster rocket engine system to boost the first stage booster to an altitude sufficient to allow non-powered flight back to the launch side; and 5) landing the first stage booster at the launch site.

By using this process, no secondary propulsion system, such as jet engines, are required. Furthermore, the use of only aerodynamic flight controls to turn the aircraft back toward the landing site requires less fuel to remain on board the first stage booster. Finally, the first stage booster will land with a minimum of residual fuel on board.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
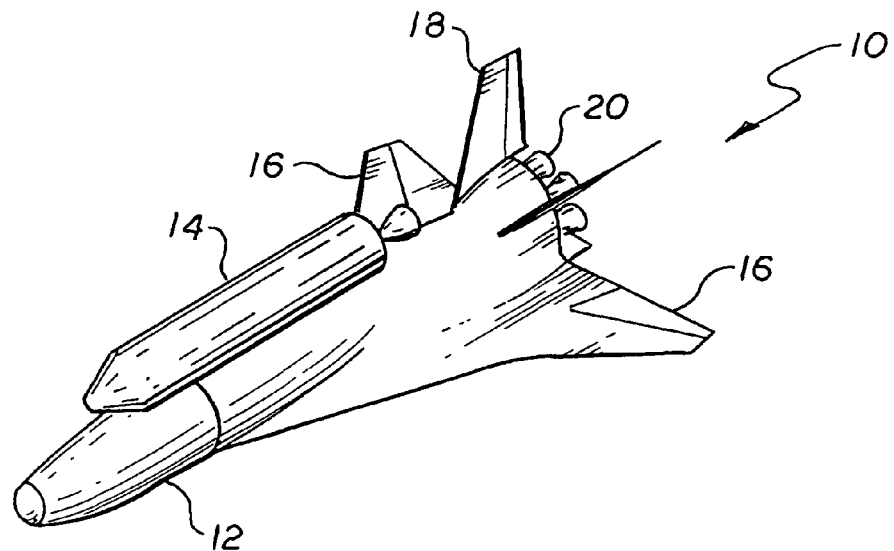
FIG. 1 is a perspective view of a two stage launch vehicle.

Referring to FIG. 1, the launch vehicle, generally indicated by numeral 10, includes a first stage booster 12 and a second stage 14 designed to reach orbit. Note that the second stage could incorporate additional stages (not shown). The first stage booster 12 includes wings 16 rudder assemblies 18 and a rocket propulsion system 20. Thus the first stage booster 12 would be unmanned and controlled from the launch site 22. The second stage 14 includes its own rocket propulsion system 15.

Figure 2:
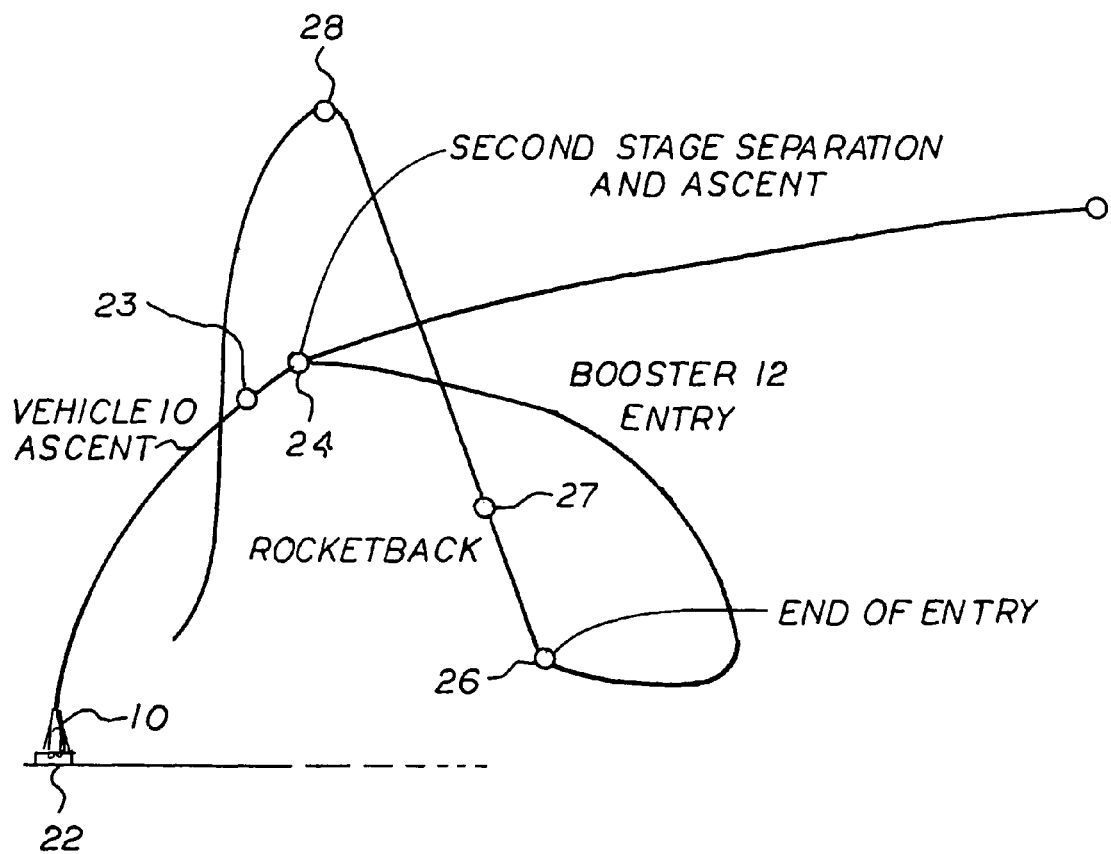
FIG. 2 is a graph of the launch and return profile for the first stage booster.
Figure 3:
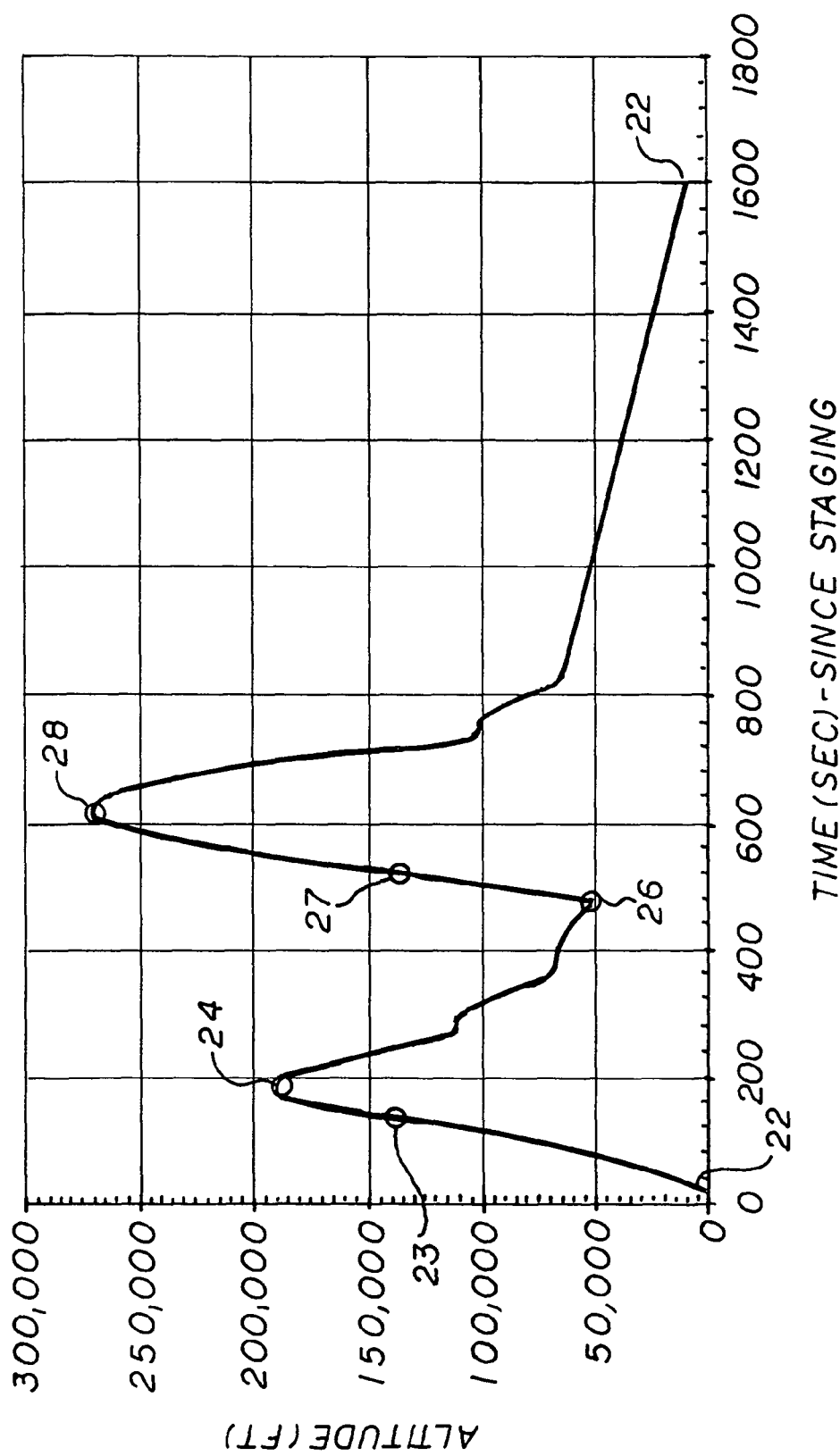
FIG. 3 is a graph of altitude versus time for launch and return of the first stage booster.

FIG. 2, is plot of the trajectory of the vehicle 10 and to FIG. 3, is a plot of altitude versus time. The vehicle 10 would take off from the launch site 22 using the propulsion system 20. The launch vehicle 10 climbs to an altitude indicated by numeral 23 and then costs to an altitude indicated by numeral 24 where the booster 12 propulsion system 20 is turned off, and the second stage 14 is released and its propulsion system 15 is ignited and accelerates upward to space. The booster 12 now descends and begins to turn back to the launch site 22. Considerable altitude is lost in this process. When the booster 12 is turned in the direction of the takeoff side 22, the propulsion system 20 is reignited at point 26. The booster 12 climbs under power to an altitude indicated by numeral 27. Being essentially empty of fuel, it coasts up to an altitude indicated by numeral 28 much higher than the stage separation point 24. At this point the booster 12 makes a ballistic reentry and glides to the launch site 22.

Figure 4:
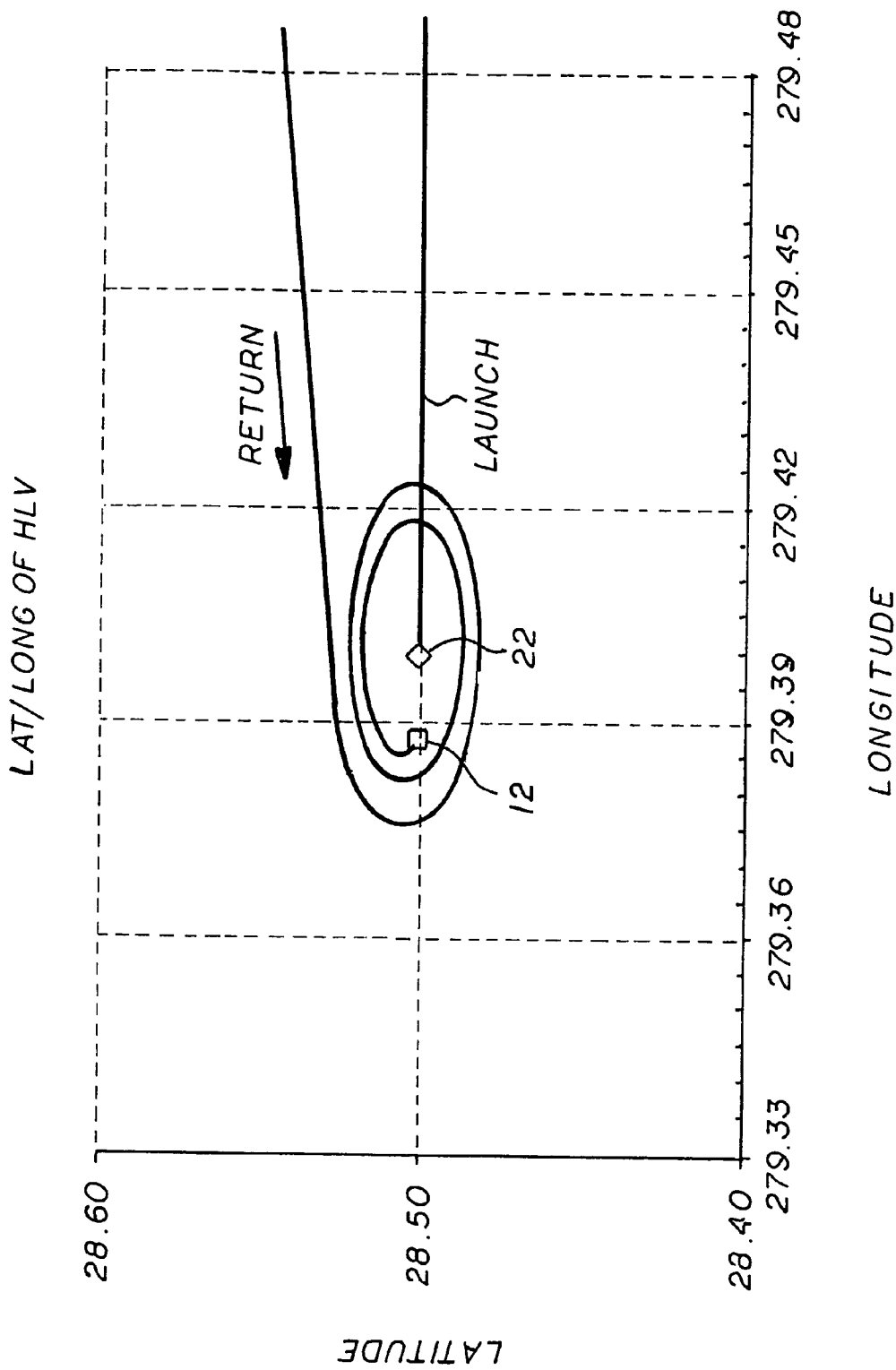
FIG. 4 is a graph of the landing profile of the first stage booster.

Note that the second stage separation occurs at around 180,000 feet and the maximum altitude reached by the booster 12 when returning to the launch site 22 is around 270,000 feet. Of course these altitudes will vary from mission to mission and individual vehicle designs. FIG. 4 illustrates the booster's spiral approach to the landing site 22. As illustrated the landing site is at Cape Canaveral, Fla.

Thus it can be seen that the process provides for a most efficient flight profile, providing optimum fuel usage and maximum flexibility in achieving return to the launch site.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to spacecraft booster manufacturing industry.

The invention claimed is:

1. A process for returning the first stage booster of a launch vehicle having at least one upper stage, the first stage booster, having a rocket propulsion system and aerodynamic flight control system, to the launch site, the process comprising the steps of:
    launching the vehicle from the launch site using the first stage booster rocket propulsion system;
    separating the at least one upper stage from the first stage booster;
    terminating operation of the first booster stage rocket propulsion system;
    turning the first stage booster back toward the launch site using the aerodynamic flight control system;
    operating the first stage booster rocket propulsion system to boost the first stage booster to an altitude sufficient to allow non-powered flight back to the launch side; and
    landing the first stage booster at the launch site.

2. A process for returning the first stage booster of a launch vehicle having at least one upper stage, the first stage booster, having a rocket propulsion system and aerodynamic flight control system, to the launch site, the process comprising the steps of:
    providing the first stage booster with fuel in excess of that required to booster the at least one upper stage to its separation point from the first stage booster;
    launching the vehicle from the launch site using the first stage booster rocket propulsion system;
    separating the at least one upper stage from the first stage booster;
    terminating operation of the first booster stage rocket propulsion system,
    turning the first stage booster back toward the launch site using the aerodynamic flight control system;
    operating the first stage booster rocket propulsion system using the fuel in excess of that required to boost the first stage booster to an altitude sufficient to allow non-powered flight back to the launch side; and
    landing the first stage booster at the launch site.

* * * * *